United States Patent [19]

Muller et al.

[11] Patent Number: 4,545,601
[45] Date of Patent: Oct. 8, 1985

[54] STAMPED STRUT AND SPINDLE SUPPORT

[75] Inventors: George H. Muller, Ann Arbor; Buddy K. Chance, Plymouth, both of Mich.

[73] Assignee: Ford Motor Company, Dearborn, Mich.

[21] Appl. No.: 526,075
[22] PCT Filed: Jul. 5, 1983
[86] PCT No.: PCT/US83/01020
§ 371 Date: Jul. 5, 1983
§ 102(e) Date: Jul. 5, 1983
[87] PCT Pub. No.: WO85/00325
PCT Pub. Date: Jan. 31, 1985

[51] Int. Cl.[4] .............................................. B60G 11/58
[52] U.S. Cl. ..................................... 280/668; 267/67; 280/666
[58] Field of Search ............... 280/668, 791, 493, 670, 280/674

[56] References Cited

U.S. PATENT DOCUMENTS

| | | | |
|---|---|---|---|
| 2,760,787 | 8/1956 | Muller | 280/696 |
| 3,083,032 | 3/1963 | Cuskie | 280/666 |
| 3,151,877 | 10/1964 | Bajer | 280/692 |
| 3,195,878 | 7/1965 | Rosky et al. | 267/67 |
| 4,223,903 | 9/1980 | Grabb et al. | 280/668 |
| 4,274,654 | 6/1981 | Travaglio | 280/668 |
| 4,441,593 | 4/1984 | Axthammer | 267/666 |
| 4,491,340 | 1/1985 | Grunberg et al. | 280/668 |

Primary Examiner—Richard A. Bertsch
Attorney, Agent, or Firm—Clifford L. Sadler; Daniel M. Stock

[57] ABSTRACT

An independent wheel suspension system for a motor vehicle includes a trailing arm (70) mounted for pivotal resilient movement through pivotal connecting members (72, 74), carried in the vehicle chassis (78). Resilient pivotal connection to a strut assembly (10) is effected through ball stud (56). The configuration and positioning of the trailing arm (70) and its mountings (72, 74, 56) elevates the vehicle roll center and reduces toe-out of the vehicle wheels during recession. An economical stamped support structure (20) having a spindle support member (36) and a strut support member (38) is utilized in the system. A combination spring seat and steering arm (22) is fixed to the top of the strut support member (38).

7 Claims, 7 Drawing Figures

U.S. Patent  Oct. 8, 1985  Sheet 1 of 4  4,545,601
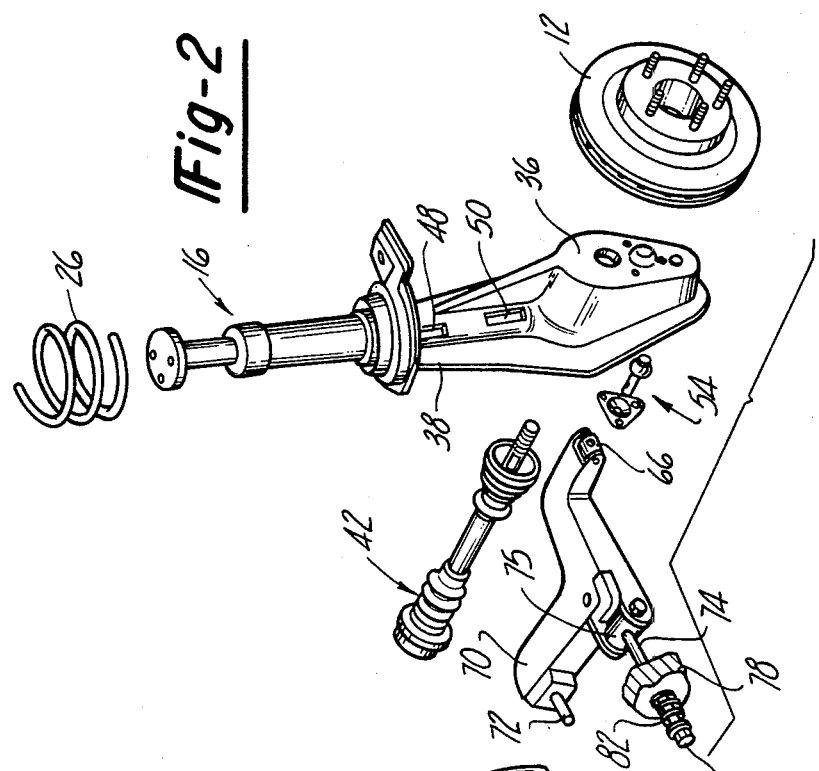
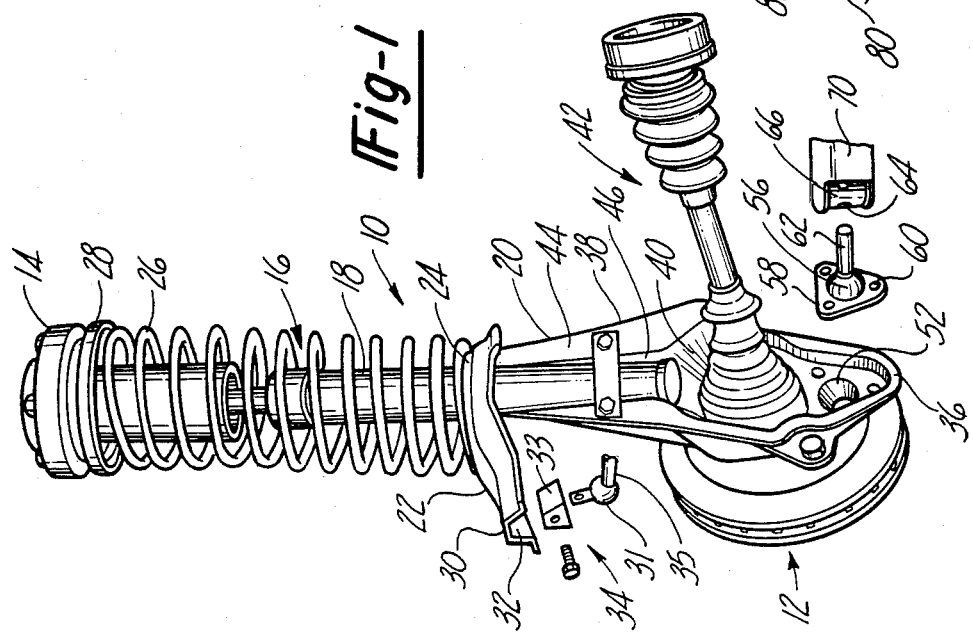

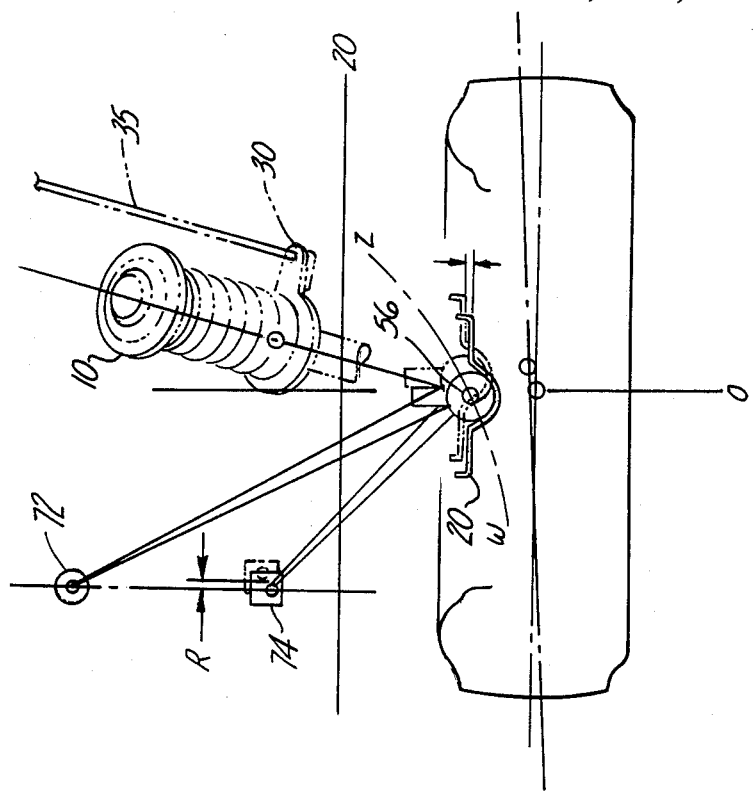
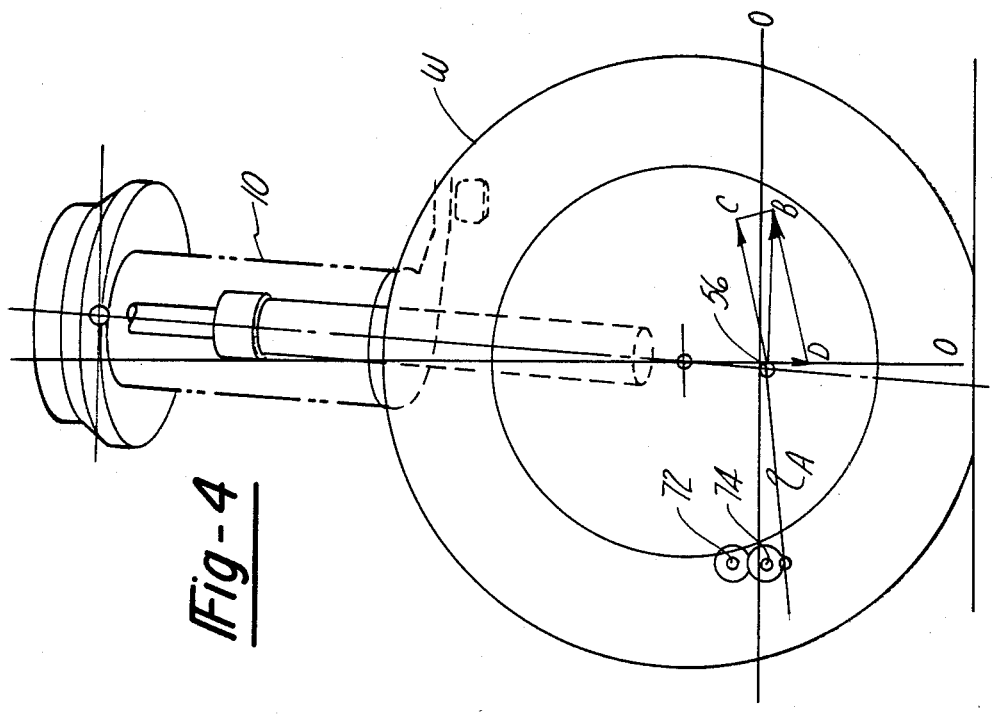
Fig-5
Fig-4

STAMPED STRUT AND SPINDLE SUPPORT

TECHNICAL FIELD

The present invention relates generally to wheel suspension systems for motor vehicles and, more particularly, to such systems which include pivotally mounted trailing arms as an element of the wheel support in conjunction with a strut and wheel assembly at a common ball joint.

BACKGROUND ART

It is known in the vehicle suspension arts to provide an independent wheel suspension for the front wheels of the vehicle which incorporates a pair of trailing arms mounted to a portion of the chassis of the vehicle. Exemplary of such independent wheel suspension systems is that disclosed in applicant's U.S. Pat. No. 2,760,787 assigned to the assignee of the present invention. Such systems provide the advantageous vehicle design capability of providing for anti-brake dive force and attitude control of the vehicle during braking. Such systems do, however, define a low roll center for the vehicle about its longitudinal vertical plane of symmetry. This has necessitated the provision of transversely extending roll bars which detract from the true independent nature of the vehicle wheel suspension system and add to vehicle weight and cost or relatively high rate suspension springs which detract from the riding comfort of the vehicle.

It is also known in the prior art to provide spring biasing or resilient members which effect resistance to wheel recession or which control wheel recession, that is, generally rearward wheel movement in response to the imposition of a frontal impact. Exemplary of systems which employ such devices are those disclosed in U.S. Pat. No. 3,083,032 to Cuskie; U.S. Pat. No. 3,151,877 to Bajer; and U.S. Pat. No. 3,195,878 to Rosky et al. The deficiency in attempting to apply such technology to a trailing arm suspension of the type of interest here is that the wheel motion occuring during recession with such cushioning structures tends to produce toe out between the front wheels of the vehicle wheel which is disadvantageous in terms of vehicle steering capability and which increases tire wear.

DISCLOSURE OF THE INVENTION

Responsive to the deficiencies in the prior art, the suspension system disclosed herein provides a trailing arm suspension system. The trailing arm is mounted to the vehicle chassis through a pair of pivotal connections, at least one of which is preferably resilient which define an axis for pivotal movement of the trailing arm which is canted upwardly toward the vertical plane of symmetry of the vehicle and in which a connection from the trailing arm to a suspension strut assembly mounted between the vehicle wheel and the body is positioned at a point above and to the rear of the pivotal axis of the trailing arm. This positioning of the chassis and strut connections of the suspension system yields a trailing arm suspension system which makes use of the anti-dive teaching of U.S. Pat. No. 2,760,787 while defining a roll center for the vehicle that is elevated above the low roll center defined by the system disclosed in that patent for roll resistance, thereby eliminating the need for a roll bar and/or high rate suspension springs. This feature of the present suspension system is claimed in the concurrently filed application of one of the present applicants entitled "ELEVATED ROLL CENTER TRAILING ARM SUSPENSION FOR MOTOR VEHICLES" U.S. Ser. No. 525,057, filed July 5, 1983.

The present suspension system further provides resilient mounting of the outboard pivotal connection of the trailing arm to provide for measurable longitudinal and rearward movement of the wheel, thus inducing wheel recession that may occur during wheel forward rolling motion over pavement irregularities. Since connection of the trailing arm to the strut assembly is effected through a ball joint connection and steering movement of the wheel is effected through another ball joint connection to the strut assembly, the toe out tendency of the wheel during recession is counteracted by the imposition of the steering load on the strut on the one hand and the freedom of pivoting movement afforded at the steering arm ball joint connection and the outboard resilient mount of the trailing arm on the other hand. This cooperative control of wheel recession movement disclosed herein is claimed in concurrently filed application of one of the present applicants entitled "TRAILING ARM SUSPENSION RECESSION CONTROL" U.S. Ser. No. 522,660, filed July 5, 1983.

In the present invention, an economical and effective support mechanism for the strut and wheel spindle of the presently disclosed wheel suspension system is provided. A pair of complementary stampings form the structure for effecting attachment to the telescoping strut, the wheel spindle, and the trailing arm; and another structure such as stamping is fixed to the top of this structure to provide a lower seat for the strut assembly's spring and concurrently and integrally a steering arm for connection to the vehicle steering system.

BRIEF DESCRIPTION OF THE DRAWINGS

The present invention can be understood by reading the following description of the best mode for carrying out the invention with reference to the accompanying sheets of drawings in which, FIG. 1 is a partially exploded perspective view of the strut assembly of the suspension system of the present invention;

FIG. 2 is an exploded perspective view from another angle of the strut assembly illustrating the connection of the trailing arm member to the strut assembly;

FIG. 4 is a diagrammatic side view of the invention suspension system;

FIG. 5 is a diagrammatic top view of the suspension system of the present invention.

DESCRIPTION OF THE PREFERRED EMBODIMENTS

Figure 3:
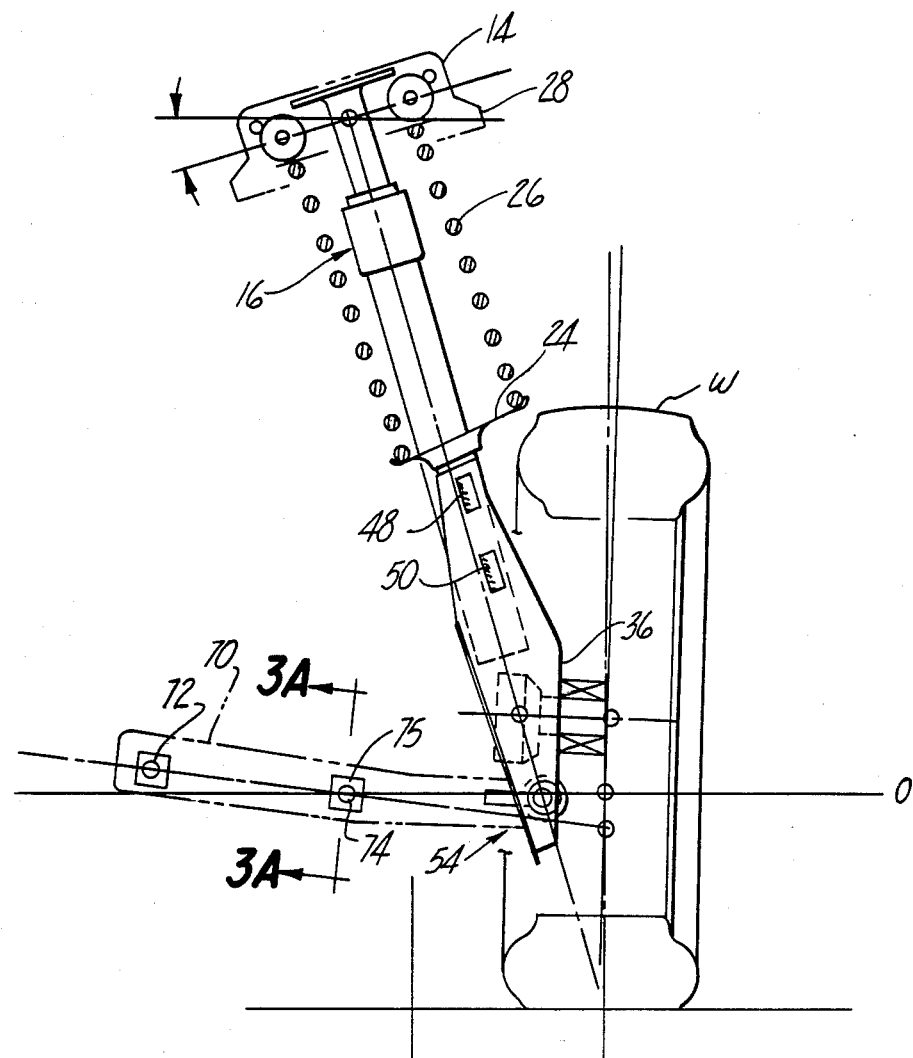
FIG. 3 is a diagrammatic cross-sectional view of the suspension system of the present invention.

Turning now to the drawings, in particular FIGS. 1 and 2 thereof, the vehicle wheel suspension of the present invention is illustrated as consisting essentially of a strut assembly indicated generally at 10 that is operatively disposed between the body (not shown), of the vehicle and a front driven wheel assembly 12 of the vehicle. It is to be understood that an essentially identical assembly is symmetrically arrayed on the other side of the vehicle. The strut assembly 10 includes an upper mounting portion 14 to provide for attachment to the vehicle body and further includes a telescoping piston and cylinder assembly 16 which may be chosen from many such assemblies available. The assembly 16 essentially includes a tubular portion 18 which is fixedly secured to a support member 20 which will be later described in greater detail. A stamped spring support member 22 is secured to the upper portion of the support portion 20 and provides a lower seat 24 for receiving a spring 26 carried in surrounding relationship about the piston and cylinder assembly 16. The upper mount portion 14 includes an upper spring seat 28 for receiving the upper end of the spring 26.

Also provided with the spring support portion 22 is an integral radially outwardly extending arm portion 30 having a pocket 32 formed therein for receiving an output portion 34 of the steering assembly of the vehicle as shown in exploded view to the left of FIG. 1. This output portion 34 includes a ball stud member 31 mounted through a bushing assembly 33 in the pocket 32 for conventional as by projection welding or crimping attachment to the arm portion 30. A fixed length link of the rod 35 operatively connects the stud member 31 to the vehicle rack and pinion steering gear system (not shown).

Considering now in more detail support portion 20, it is illustrated in FIG. 1 as comprising a wheel or spindle support member 36 and a strut support member 38. The two members are arranged as a unitary assembly in abutting relationship in the lower portion of the assembly and define a conventional mounting base of locally doubled thickness for the wheel 12 providing a cavity 40 through which a drive unit such as a front wheel drive half shaft assembly 42 may be operatively connected to the wheel 12. The strut support member 38 includes an upstanding arm portion 44 defining a channel 46 for receiving the tube 18 of the piston and cylinder assembly 16. A plurality of apertures 48, as may best be seen in FIG. 2, are formed through the arm portion 44 for permitting welding attachment as indicated at 50 of the strut assembly to the spindle support 20. A generally hemispherical depression 52 is formed on the inner face of the spindle support member 36 and the abutting support member 38 at a position below the center line of the wheel 12. A ball stud 54 having an elastomeric cushion formed about its ball end 56 is inserted into the depression 52 and retained in place by a retaining plate or ball socket 58 secured by suitable fasteners (not shown) as through the apertures indicated at 60 in the plate 58. The stud portion 62 of the ball stud 54 is received through a cross hole 64 formed through a clamping bushing 66 carried by a portion of a trailing arm 70.

The trailing arm 70 is pivotably mounted on a generally transversely extending portion of the chassis of the vehicle by operation of two transversely spaced stud members 72, 74. It is to be understood, however, that for vehicle configurations using different structural orientations, the mountings here described as being effected at body or chassis positions may be functionally duplicated by connections effected in frames, subframes and unit body components without departing from the present teaching. As may best be seen in FIGS. 3, 4 and 5, the stud members 72, 74 define an axis of rotation upwardly canted toward the center line of the vehicle and the ball stud 56 is positioned upwardly and rearwardly of that axis of rotation.

The inboard stud member 72 is of preferably a conventional pivotally mounted construction while the outboard stud member 74 is resiliently mounted. In the embodiment illustrated in FIG. 2, the outboard mounting stud 74 includes a stud member carried in a resiliently mounted bushing 75 having a rotational axis transverse to the longitudinal axis of the vehicle. The stud 76 extends forwardly through a portion 78 of the vehicle chassis and includes an enlarged head portion 80 to capture a spring 82 between the stud 76 and the chassis portion 78.

Figure 3A:
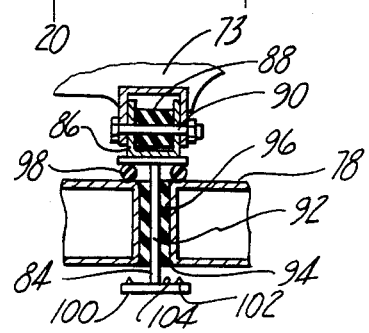
FIG. 3A is an enlarged cross-sectional view of the resilient pivotal mounting of one end of the trailing arm.

A more preferred configuration for the outboard pivotal connection 74 is illustrated in FIG. 3a. In this embodiment a stud member 84 includes an eye portion 86 for receiving an elastomeric bushing 88 by which the stud member 84 is resiliently mounted on a transversely extending cross-bolts 90 carried in the outboard portions 73 of the trailing arm 70. A forwardly extending generally cylindrical shaft portion 92 of the stud member 84 is resiliently mounted in another elastomeric sliding bushing 94 which may slidingly engage the stud member or may fixedly engage it in shear and which is carried in an aperture 96 formed through the chassis portion 78 of the vehicle. Forward movement of the stud 84 is cushioned by a cushion member such as the O ring depicted at 98 and rearward movement is limited by provision of an enlargement 100 formed on the forward end of the stud portion 94. Elastomeric buttons 102 or other cushioning means such as an "O" ring may be provided on the rear face 104 of the enlargement.

Operation of the vehicle suspension system in the present invention may be better understood by reference to the schematic representations of the system depicted diagrammatically in FIGS. 3-6.

It can be seen in these Figures that the suspension system of the present invention makes use of the teaching of applicant's previously mentioned U.S. Pat. No. 2,760,787, which is incorporated herein by reference, by defining wheel suspension geometry which provides for an anti-brake dive feature. As can best be seen in FIG. 4, ball stud 56, through which connection is made between the spindle support member 20 and the chassis mounted trailing arm 70, is positioned above and to the rear of trailing arm pivot connections 72, 74. Line A of the FIG. 4 indicates the plane of the trailing arm 70 through which vehicle braking forces must act. Therefore, upon application of a horizontal braking force on the wheel W, represented by the vector B in FIG. 4, that braking force is resolved into a component C acting generally rearwardly along the trailing arm 70 and a component D acting generally downwardly through the wheel W to the ground. The reaction to the component D through the ball stud 56 tends to pivot the trailing arm 70 upwardly, opposing the tendency of the vehicle to dive in response to the horizontal weight transfer resulting from vehicle deceleration due to application of braking force.

Figure 6:
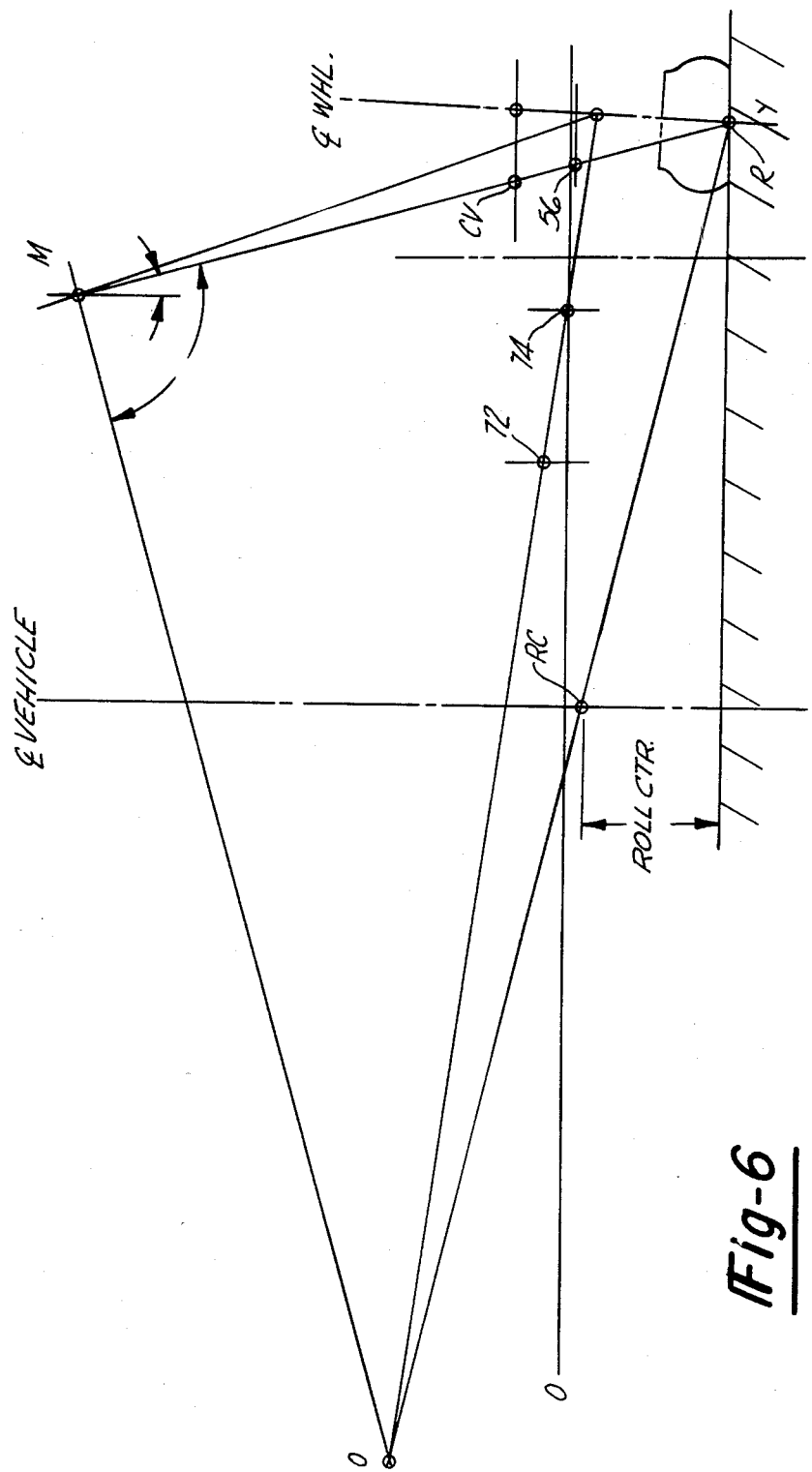
FIG. 6 is a diagrammatic presentation of the definition of the roll center of the suspension system of the present invention.

It will be noted, however, that while the general anti-dive effect above described is as provided by the prior art system of U.S. Pat. No. 2,760,787, the suspension system of the present invention differs from the prior art system in certain advantageous respects. One such difference, best illustrated in FIG. 6, is the provision of an elevated roll center for the suspension system. In FIG. 6, schematic point M represents the center of the body mounting portion 14 of strut assembly 10. The line X-Y therefrom extending through the drive center CV of the half shaft assembly 42, the strut steering connector 34, and the ball joint connection 56 to the point R at the center of the wheel W represents the plane in which connections between the body, wheel, strut and road are effected. As is well known in the suspension arts Point O, the instantaneous suspension center is established by projecting perpendicularly from the point M to the point of intersection with the plane defined by pivotal mounts 72, 74 of trailing arm 70 through which connection to the vehicle chassis is effected. Projecting from this point O to the point R at the intersection of the wheel center and the ground yields a roll center at intersection point RC with the vehicle center line which is elevated above the ground for this suspension system. It has been established that such elevation of the roll center can eliminate the need for a transversely extending roll bar or higher rate suspension springs or a combination of both. Thus, a truly independent front suspension can be provided at reduced cost and without sacrifice of riding comfort.

Another advantageous difference from the prior art system, best illustrated in FIGS. 3A and 5, is the resilient recession control afforded by the configuration of the trailing arm outboard pivotal connection 74. Rearward (rightward as indicated at R in FIG. 5) movement of the wheel W in response to the frontal impact is resiliently resisted by the outboard pivotal connection 74 as may be appreciated by the description of the alternative constructions of pivotal mounting 74 illustrated in FIGS. 2 and 3A. In FIG. 5, the movement of pivotal mount 74, which is preferably accommodated by mounting inboard pivotal mount 72 for limited angular movement is diagrammatically illustrated. Were the steering arm portion 30 of strut assembly not restrained from rotative movement by the fixed length steering link 35, this movement of trailing arm 70 would cause the wheel W to toe out as ball stud 56, and consequently the wheel W would shift arcuately counterclockwise as viewed in FIG. 5. However, because the fixed length rod 35 does not permit rotative movement of the arm 30, the wheel W is constrained to move straight backward and inward as the spindle support 20 effectively rotates about the ball stud 56. It can be appreciated that a slight change in wheel tread path occurs during this motion. Perfect parallel displacement of the wheel W can be obtained at a given vehicle riding height by proper selection of angular position, as perceived in the plan view of FIG. 5, of the theoretical steering arm axis at its connection to the fixed length steering linkage 35 and the theoretical king pin axis.

While only certain variations from the disclosed embodiment have been described or suggested, others may be possible without departing from the scope of the appended claims.

What is claimed is:

1. An independent wheel suspension system for the steerable wheels of a vehicle of the type wherein a resiliently telescoping strut assembly is interposed between the wheel and a portion of the vehicle body at each wheel and a trailing arm member is pivotally mounted to the wheel and strut assembly and is pivotally mounted to the vehicle chassis forwardly of the wheel, characterized in that the strut assembly includes a telescoping portion and a support portion comprising a strut support stamping fixedly secured to the telescoping portion and a spindle support stamping attached to the strut support stamping to form a unitary structure, the strut support stamping having portions integrally formed therewith for effecting pivotal connection with the trailing arm member.

2. An independent wheel suspension system as defined in claim 1, further characterized in that a spring is carried in surrounding relationship about the telescoping portion received at its upper end by upper seat carried with the vehicle body, and a lower seat member is fixed to the upper end of the strut support stamping for receiving the lower end of the spring, the lower seat member having integrally formed therewith a radially extending steering arm portion connectable to the steering system of the vehicle.

3. An independent wheel suspension system as defined in claim 2, further characterized in that the lower seat member is formed as a stamping.

4. An independent wheel suspension system as defined in claim 1, further characterized in that the strut support stamping includes apertures formed therethrough in axial registration with the portions of the telescoping strut assembly and weldments are provided at the apertures for fixedly securing the strut support stamping to the strut assembly portions.

5. An independent wheel suspension system for the steerable wheels of a vehicle of the type wherein a resiliently telescoping strut assembly is interposed between the wheel and a portion of the vehicle body at each wheel and a trailing arm member is pivotally mounted to the wheel and strut assembly and is pivotally mounted to the vehicle chassis forwardly of the wheel, characterized in that a support portion is provided attached to the telescoping portion and the vehicle wheel and a dish-like spring support member is fixed to one of the upper end of the strut support stamping or the telescoping strut assembly to define the spring lower seat and a radially extending arm portion is integrally formed therewith for attachment to a vehicle steering system.

6. A suspension strut assembly for a motor vehicle steerable wheel of the type having a telescoping portion surrounded by a spring carried between upper and lower spring seats and fixedly secured to the vehicle steerable wheel characterized in that a support member is provided for the strut assembly which comprises a strut support stamping fixedly secured to the telescoping portion and a spindle support stamping complimentarily attached to the strut support stamping to form a unitary structure, and wherein the strut support stamping includes portions formed integrally therewith for receiving means for pivotally mounting other vehicle suspension components.

7. A suspension strut assembly for a motor vehicle steerable wheel of the type having a telescoping portion surrounded by a spring carried between upper and lower spring seats and fixedly secured to the vehicle steerable wheel characterized in that a support member is provided for the strut assembly which comprises a strut support stamping fixedly secured to the telescoping portion and a spindle support stamping complimentarily attached to the strut support stamping to form a unitary structure, and a dish-like spring support member is fixed to one of the upper end of the strut support stamping or the telescoping strut portion to define the spring lower seat and a radially extending arm portion is integrally formed therewith for attachment to a vehicle steering system.

* * * * *